United States Patent [19]
Mattson

[11] 3,807,798
[45] Apr. 30, 1974

[54] HARNESS
[76] Inventor: John E. Mattson, 26136 Hampden, Madison Heights, Mich. 48071
[22] Filed: Sept. 1, 1972
[21] Appl. No.: 285,886

[52] U.S. Cl. .............................................. 297/386
[51] Int. Cl. ............................................ A62b 35/60
[58] Field of Search ............ 297/385, 389, 386, 384, 297/390; 2/336, 338; 161/76, 77; 139/422

[56] References Cited
UNITED STATES PATENTS
2,823,046  2/1958  Banta ............................. 297/386 X
2,021,352  11/1935 Eustis ................................... 161/76
3,550,956  12/1970 Lowe ............................... 139/383 R
1,483,192  2/1924  Langgons ............................... 2/338
1,151,708  8/1915  Neff ........................................ 2/338

Primary Examiner—James T. McCall
Attorney, Agent, or Firm—David A. Maxon

[57] ABSTRACT

A resilient yieldable woven material member fixed at the ends thereof to a passenger translational restraint member.

3 Claims, 2 Drawing Figures

PATENTED APR 30 1974    3,807,798

HARNESS

This invention relates generally to passenger restraint apparatus incorporating fabric members. More particularly, this invention relates to lap belts and shoulder harnesses for use in automobiles to restrain passengers movement during sudden deceleration of the vehicles incorporating means of flexing in a limited yieldable manner responsive to the buckling or locking of such members and to motion of the passengers with respect to the motion of the vehicle.

In the provision of the lap belts and shoulder harnesses, it has been a common practice to design such restraints with a substantially fixed rigid length after buckling, latching or locking of the seat restraints. This has caused a considerable amount of discomfort and lack of sufficient mobility, particularly of the driver, in order to sufficiently restrain for safety purposes.

To some extent, this problem has been overcome in the lap belt only, by the provision of a spring actuated retractable member for only one portion of the lap belt. However, because this particular form of retraction has been confined to the lap belt only, but also to only one fabric member and not both fabric members of the lap belt, sufficient freedom has not been obtainable once the passenger, particularly the driver, has buckled his belt. More importantly, some passengers, particularly drivers, have been tempted to buckle at a loose position allowing sufficient freedom to shift gears and actuate other switches and mechanisms such as parking brakes, while operating the vehicle and yet not providing sufficient restraint in the event of a sudden or severe deceleration of the vehicle.

Accordingly, it is an object of this invention to provide a fabric-like flexible, yieldable portion in both a lap belt and shoulder harness in a passenger seat restraint system operable to allow limited passenger movement with respect to the seat while maintaining safe limits on such movement during sudden deceleration of the vehicle. This and other objects of this invention will become apparent from the following specifications and claims.

In achieving this and other objects, a fabric member having limited yieldable movement in a track along the length of a seat restraint member to which it is fixed at both ends thereof is provided for both a lap belt and a shoulder harness in a motor vehicle passenger seat restraint system.

ON THE DRAWINGS

Before explaining the present invention in detail, it is to be understood that the invention is not limited in its application to the details in construction and arrangement of parts illustrated in the accompanying drawings since the invention is capable of other embodiments and of being practiced or carried out in various ways.

Also, it is to be understood that the phraseology and terminology employed herein are for the purpose of description and not of limitation.

AS SHOWN ON THE DRAWINGS

Figure 1:
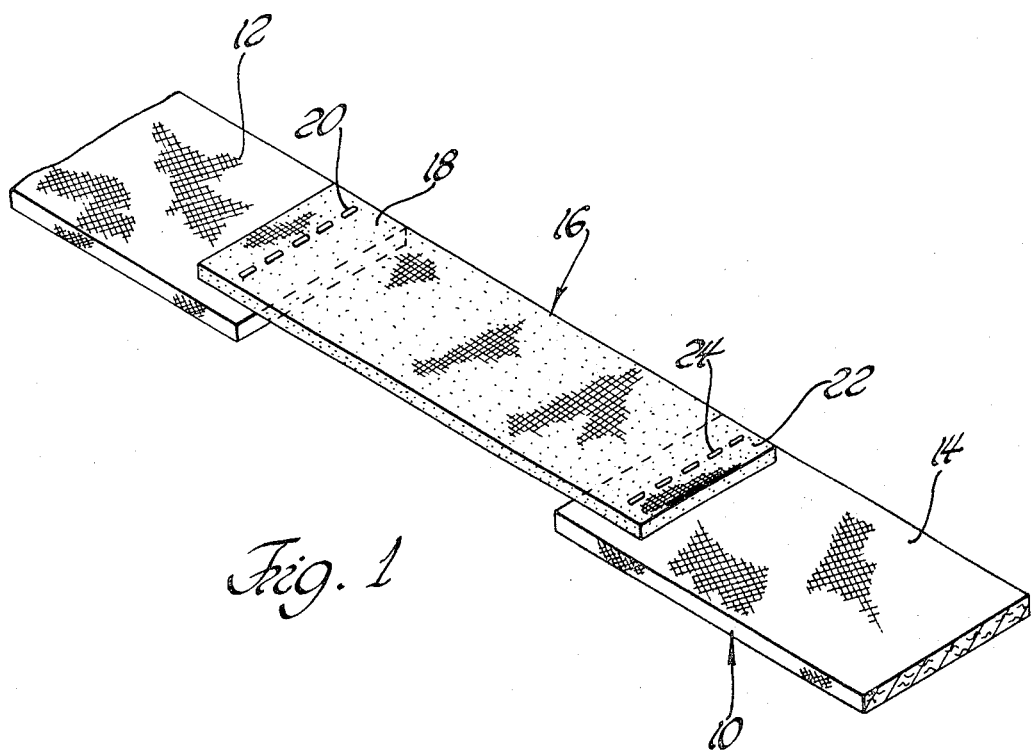
FIG. 1 is a partial cut-away view of a portion of a member of a seat restraint member utilizing the preferred embodiment of this invention.

FIG. 1 shows a portion of a seat belt 10 incorporating the improvements of this invention. The seat belt portion 10 comprises a first strapped section 12 which is anchored to the vehicle on one side of the passenger and another portion 14 which is attached to a buckle (not shown) the seat belt portions 12 and 14 are connected by a web member 16. The left-most portion 18 of the web 16 is fixedly attached by means of stitching 20 or other appropriate means for fixing the web to portion 12. The right-most portion 22 of the web 16 is similarly stitched as indicated at numeral 24 to the right-most portion 14.

The seat belt portions 12 and 14 are preferably made of a fabric able to withstand substantial tensile force along their length and are sufficiently heavy and thick to withstand or resist curling or buckling in a direction antiparallel to their length.

Figure 2:
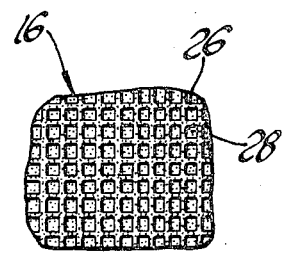
FIG. 2 is a magnified view of a portion of the apparatus shown in FIG. 1.

The web member 16 is woven in a manner illustrated in FIG. 2 with threads 26 spaced apart by interstices 28. The fabric of the threads 26 is made of a plastic or rubber-like substance that can be stretched in an elastic manner and subsequently returned to its original length after stretching. An elastic material such as that used in waistbands and other stretchable fabric-like material would be suitable. The weave with appropriate size interstices between the threads of the web or combination of threads woven into strands can be selected in a manner to provide a predetermined spring rate of the web 16.

The above described embodiment is operable to restrain a passenger or driver from movement during sudden deacceleration of the vehicle or collision, thereby preventing serious bodily injury.

When a belt utilizing the device 10 is pulled about a passenger either as a seat belt or as a shoulder harness, the predetermined spring rate of the web 16 will allow some stretching or "give" in response to desired movements of the passenger or driver of the vehicle while still providing substantial restraint in the event of a sudden deacceleration or collison of the vehicle.

It can be appreciated from the foregoing description that a passenger restraint article has been provided with an elastic web that has a predetermined spring rate chosen for elastic properties suitable for passenger restraint. This is distinguished from a passenger restraint member having a spring member at one end thereof for retraction of the belt. In the latter case the spring rate of such a member for belt retraction is chosen in order to be sufficient to provide retraction and not for stretching of the belt for desired movements of the passenger or of the driver.

I claim:

1. In a passenger restraint apparatus having a belt, the improvements comprising:
    a pair of belt portions made of heavy fabric;
    an elastic web connecting said belt portions and being fixedly attached at the end thereof to the ends of the belt portions;
    said web comprising a weave of strands, each strand being made of an elastic material;
    the weave of said web member having interstices with dimensions several orders of magnitude greater than interstices in the weave of the belt portions;
    said web portion having a spring rate in response to tensions directed along the length thereof determining a degree of stretch of the web in response to the force of said tensions allowing some movement of a passenger restraint by the belt and inhibiting other desirable movements of the passenger;

2. The apparatus of claim 1 wherein said web is stitched to the belt portions.

3. The apparatus of claim 1 incorporated in both belt portions of a seat belt and both belt portions of a shoulder harness in combination.

* * * * *